United States Patent
Chen

(10) Patent No.: US 6,280,030 B1
(45) Date of Patent: Aug. 28, 2001

(54) EYEGLASSES ASSEMBLY

(76) Inventor: Wu Meihua Chen, 28-2, Sa Ren Road, Chong Sa Village, An Den Country, Tainan (TW)

( * ) Notice: Subject to any disclaimer, the term of this patent is extended or adjusted under 35 U.S.C. 154(b) by 0 days.

(21) Appl. No.: 09/655,859

(22) Filed: Sep. 6, 2000

(51) Int. Cl.⁷ .................................................. G02B 1/00
(52) U.S. Cl. ........................... 351/86; 351/83; 351/103; 351/106
(58) Field of Search ................... 351/83, 86, 85, 351/87, 90, 92, 91, 103, 106, 41, 105, 108

(56) References Cited

U.S. PATENT DOCUMENTS

| | | | |
|---|---|---|---|
| 5,703,669 | * | 12/1997 | Park ........................................ 351/86 |
| 5,903,331 | * | 5/1999 | Lin ......................................... 351/105 |

* cited by examiner

Primary Examiner—Hung Xuan Dang
(74) Attorney, Agent, or Firm—Rosenberg, Klein & Lee

(57) ABSTRACT

The present invention relates to an eyeglasses assembly comprising: a frame, two temples and a lens unit. The frame comprises: a transverse rod, a first groove, a second groove, an extension plate, a supporting plate and an arcuate plate. The transverse rod has a middle portion and two ends for connecting to the temples. The middle portion has a flange extending downward. The extension plate is connected to the middle portion and extends downward. The supporting plate is connected to the extension plate. The arcuate plate is connected to the supporting plate and extends downward from the supporting plate. The first groove is formed between the flange and the extension plate. The second groove is formed between the extension plate and the arcuate plate. The lens unit comprises two lenses and a connecting portion for connecting the two lenses. The connecting portion has an arcuate under edge and an upper edge. The lens unit is combined to the frame by obliquely inserted and positioned the arcuate under edge into the second groove then by positioned the upper edge into the first groove. The lens unit can be combined easily to the frame, and be separated easily from the frame. According to the invention, it is easy to switching the lens unit so that there are many various types on the eyeglasses assembly.

2 Claims, 4 Drawing Sheets

EYEGLASSES ASSEMBLY

BACKGROUND OF THE INVENTION

1. Field of the Invention

The present invention relates to eyeglasses, more particularly, to an eyeglasses assembly.

2. Description of the Related Art

Owing to many reasons, for example one's body or the bad pose in reading, people usually suffer from nearsight and farsight, and must wear eyeglasses to correct their sight. The conventional eyeglasses mainly comprises a frame, two lenses and temples. The temples are combined to the frame, and the lenses are installed into the inside edge of the frame. In considering the shape of the eyeglasses and the convenience on the combination, there are many types of combination for the lens and the frame.

Referring to FIG. 1, a conventional eyeglasses assembly mainly comprises: a frame 11, two temples 12, and a lens unit 13. The frame 11 has a transverse rod 111 formed an arcuate shape. The transverse rod 111 has two ends for connecting to the temples 12. A groove 112 is formed on a underside of the transverse 111. The width of the groove 112 is approximately equal to the width of the lens unit 13. The lens unit 13 comprises two lenses 131. In combination, a upper edge of the lens unit 13 is forced and received into the groove 112. However, such a long and narrow section of the groove 112 makes a difficult process on combining the upper edge of the lens unit 13 to the groove 112.

Furthermore, because the groove 112 has a downward open, it is easy to separate the lens unit 13 from the groove 112 when the groove 112 is loose. Therefore, referring to FIG. 1, there are screws 132A and 132B to cross through the transverse rod 111 and to hold and fix the lens unit 13. However, more complicated process will be performed to combine the eyeglasses assembly.

SUMMARY OF THE INVENTION

One objective of the present invention is to provide an eyeglasses assembly comprising a frame, two temples and a lens unit. According to the invention, it is easy and fast to combine the frame and the lens unit. It is also easy to separate the lens unit and the frame for switching the lens unit so that there are many various types on the eyeglasses assembly.

DETAILED DESCRIPTION OF THE INVENTION

Figure 1:
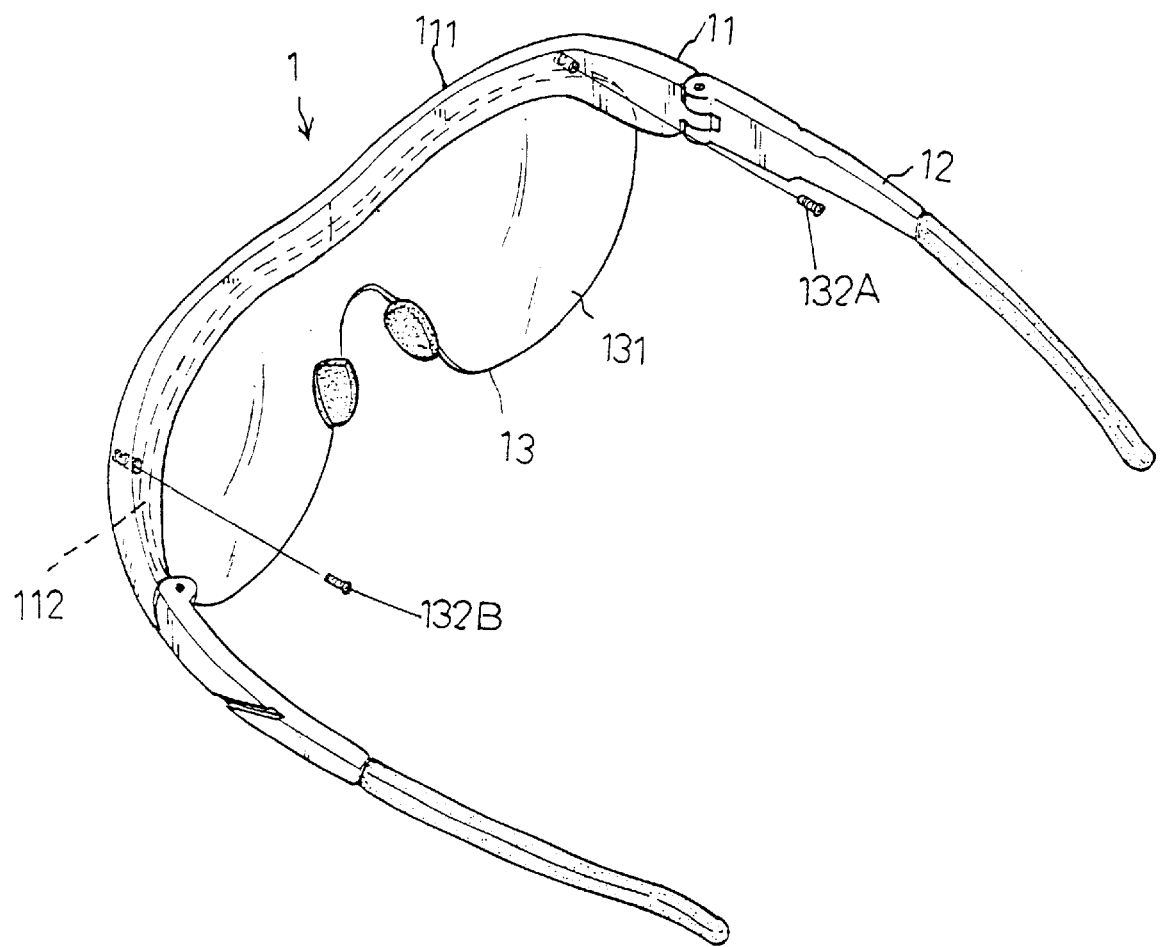
FIG. 1 shows a perspective view of the conventional eyeglasses assembly.
Figure 2:
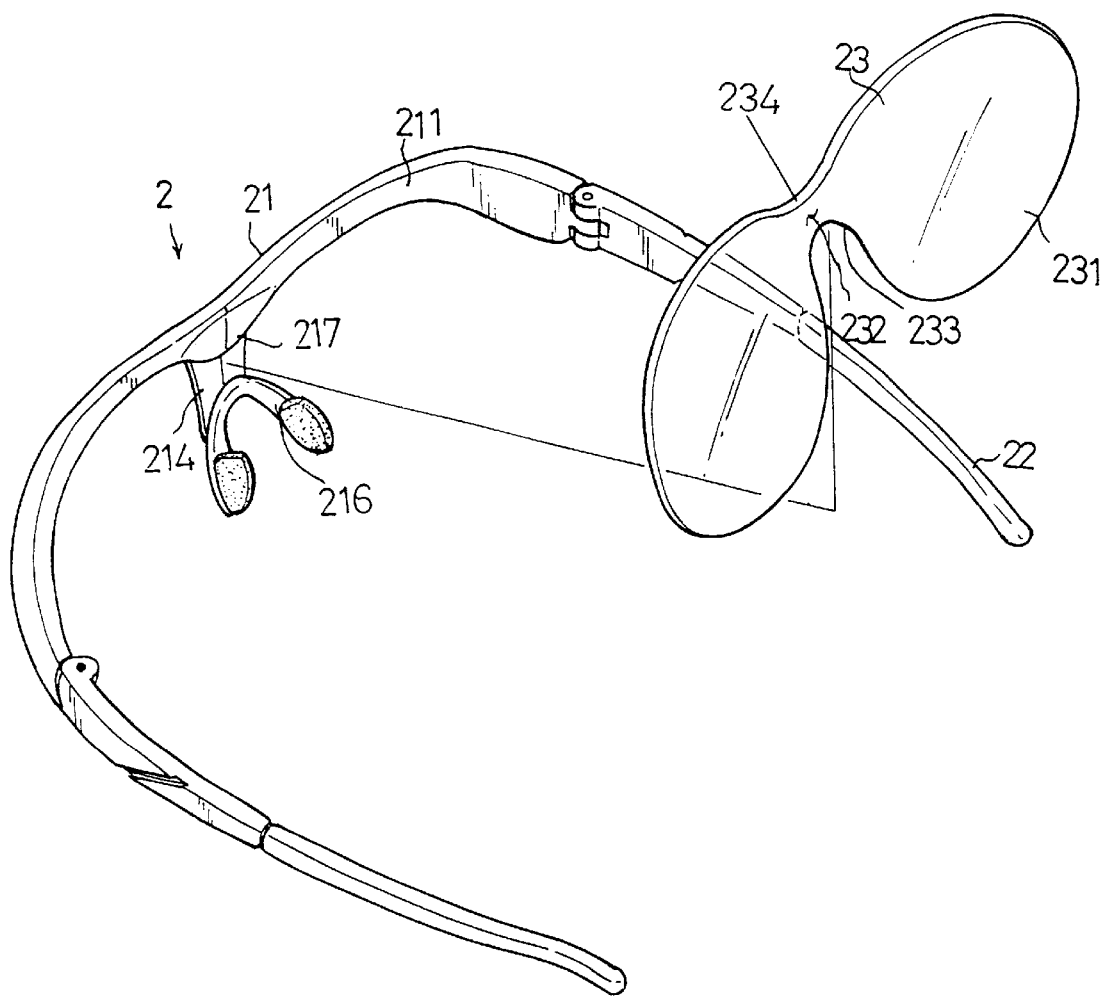
FIG. 2 shows an exploded perspective view of the eyeglasses assembly according to the invention.

Referring to FIG. 2, according to the invention, an eyeglasses assembly 2 comprises: a frame 21, two temples 22 and a lens unit 23. The frame 21 comprises: a transverse rod 211, a first groove 212, a second groove 213, a extension plate 214, a supporting plate 215 and an arcuate plate 216. The transverse rod 211 is formed an arcuate shape. The transverse rod 211 has a middle portion and two ends. The ends are connected to the temples respectively. The middle portion has a flange 217 extending downward. The extension plate 214 is connected to the middle portion of the transverse rod 211 and extends downward from the middle of the transverse rod 211. The extension plate 214 is opposed to the flange 217. The supporting plate 215 is connected to the extension plate 214, and vertical to the extension plate 214. The supporting plate 216 has an arcuate shape. The arcuate plate 216 is connected to the supporting plate 215 and extends downward from the supporting plate 215. The first groove 212 is formed between the flange 217 of the middle portion of the transverse rod 211 and the extension plate 214. The first groove 212 has a downward open. The second groove 213 is formed between the extension plate 214 and the arcuate plate 216. The second groove 213 has an upward open opposed to the downward open.

The lens unit 23 comprises two lenses 231 and a connecting portion 232. The connecting portion 232 connects the two lenses 231. The connecting portion 232 has an arcuate under edge 233 and an upper edge 234.

Figure 3:
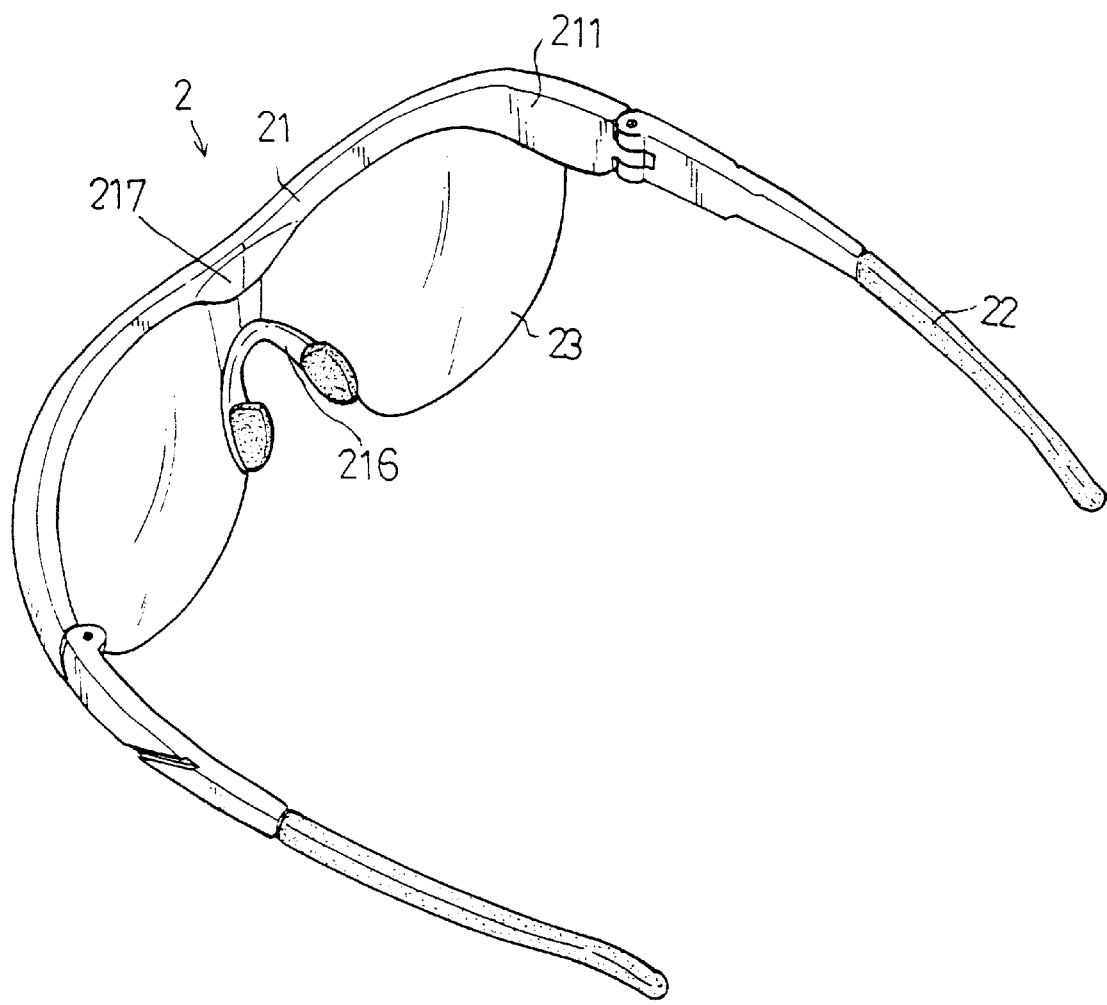
FIG. 3 shows a perspective view of the eyeglasses assembly according to the invention.
Figure 4:
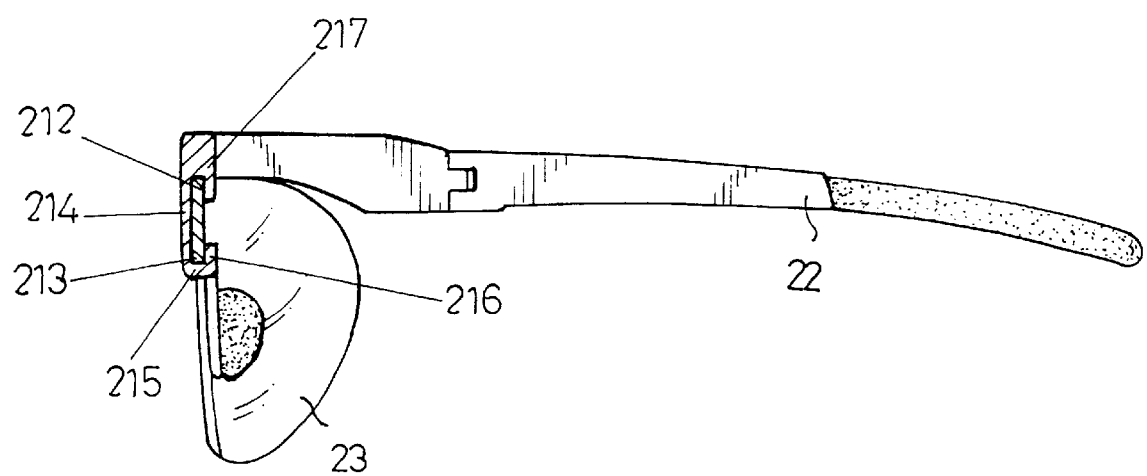
FIG. 4 shows a cross-sectional view of the eyeglasses assembly according to the invention.

Referring to FIGS. 3 and 4, the lens unit 23 is combined to the frame 21. The arcuate under edge 233 of the lens unit 23 is inserted obliquely and positioned into the second groove 213 through the upward open. Then, the upper edge 234 of the lens unit 23 is forced and positioned into the first groove 212 through the downward open. The width of the first and second grooves 212 and 213 is slightly larger than that of the lens unit 23. Therefore, the lens unit 23 can be combined tightly to the frame 21.

It is noted that the lens unit 23 preferably is made of a material with light weight so that the lens unit 23 can be supported by the supporting plate 215. The supporting plate 215 has an arcuate shape for matching the arcuate under edge 233 such that the lens unit 23 can be tightly combined to the frame 21. The lens unit 23 can be combined easily to the frame 21, and be separated easily from the frame 21. According to the invention, it is easy to switching the lens unit so that there are many various types on the eyeglasses assembly.

While an embodiment of the present invention has been illustrated and described, various modifications and improvements can be made by those skilled in the art. The embodiment of the present invention is therefore described in an illustrative but not restrictive sense. It is intended that the present invention may not be limited to the particular forms as illustrated, and that all modifications which maintain the spirit and scope of the present invention are within the scope as defined in the appended claims.

What is claimed is:

1. An eyeglasses assembly, comprising:

two temples;

a frame having:
   a transverse rod formed an arcuate shape and having a middle portion and two ends for connecting to the temples, the middle portion having a flange extending downward;
   an extension plate connected to the middle portion and extending downward, the extension plate opposed to the flange;
   a supporting plate connected to the extension plate and vertical to the extension plate;
   an arcuate plate connected to the supporting plate and extending downward from the supporting plate;
   a first groove formed between the extension plate and the flange and having a downward open; and a second groove formed between the extension plate and the arcuate plate and having an upward open opposed to the downward open; and a lens unit having two lenses and a connecting portion for connecting the two lenses, the connecting portion having an arcuate under edge and an upper edge;

thereby the lens assembly is combined to the frame by obliquely inserted and positioned the arcuate under edge into the second groove through the upward open then by positioned the upper edge into the first groove through the downward open.

2. The eyeglasses assembly as claimed in claim 1, wherein the supporting plate has an arcuate shape for matching the arcuate under edge such that the lens unit can be tightly combined to the frame.

\* \* \* \* \*